3,323,928
CEMENT CONTAINING CALCIUM CARBONATE PARTICLES COATED WITH BIS(TRIBUTYLTIN)-OXIDE

Lewis B. Weisfeld, Highland Park, N.J., assignor to Carlisle Chemical Works, Inc., Reading, Ohio
No Drawing. Filed Sept. 16, 1964, Ser. No. 397,014
3 Claims. (Cl. 106—148)

This invention relates to an improved tape joint cement and to similar compositions.

In making wall board joints, the adjoining wall boards or sheet rock are brought into abutting relationship, and joint cement or an adhesive is placed at and over the joint. Wallboard tape is then applied over the joint and is securely fixed by the cement or adhesive. Finally, the wall is painted, whereby the tape joint is covered.

Tape joint cements, whether in powdery or paste form, contain mostly calcium carbonate as one of the principal ingredients and as adhesive casein and/or other adhesive compounds such as cellulosic substances, carbohydrates, polyvinyl acetate, polyvinyl alcohol, and other synthetic materials which have the common property to be subject to microbial attack. If joint cements of this type do not contain a fungicide there is always the risk that fungi will attack the compound when several days or weeks pass before the paint is applied to the walls and joints. When in the meantime the cement has been infected, the paint will become infected too over the joints and discoloration will appear along the entire length of the joints.

Particularly, dry soluble casein mixes should contain a preservative to prevent the casein from putrefaction after the cement has been mixed with water. Often, the unused cement, which has already been mixed with water, is kept for the next day's work or even longer. If the cement is not adequately protected with a microbiocide, it will putrefy, and then the unused wet material must be discarded.

The preservatives generally used have been chlorinated phenols and organomercurials. These compounds are quite toxic also to humans, and the chlorinated phenols and their derivatives have, in addition, lachrymatory effects.

In recent years, certain organotin compounds, which are less toxic to humans than many of the conventional preservatives, have been used as toxicants for various purposes. However, when incorporated in tape joint compounds, they lost their efficiency within a relatively short time. This applied also to bis (tri-n-butyl)tin) oxide which has been used as a fungicide and protective agent for various applications but which also did not retain its activity.

I have now found that the efficiency and useful life of the bis (tri-n-butyltin) oxide in tape joint compounds is greatly enhanced when it is applied adsorbed on calcium carbonate. I am well aware that calcium carbonate and similar compounds have been widely used as inert carriers for insecticides and fungicides to apply such materials in the form of toxic dusts. However, in such applications, the calcium carbonate has the only purpose to produce a fine distribution and dispersion of the toxicant. The casein mixes of the type here involved are not used in fine dispersion, and a thorough and even incorporation of the preservative would be obtained by applying the latter as liquid or in solution. Therefore, I have no satisfactory explanation for the superior performance of bis (tri-n-butyltin) oxide in casein tape joint cements when applied adsorbed on calcium carbonate. This effect is all the more surprising as such tape joint cements frequently contain calcium carbonate as a major constituent and as it should have been expected that bis (tri-n-butyltin) oxide added to such calcium carbonate containing cement would develop the same properties as if applied together with additional calcium carbonate. As will be seen from the examples given hereinbelow, there is a remarkable difference between the two forms of application.

In carrying out the invention, 1–15 parts of bis (tributyltin) oxide are dissolved in a suitable solvent, e.g. acetone, 99 to 85 parts of ground calcium carbonate are added to this solution to form a slurry which is spread for evaporation of the solvent. The end product is a free flowing powder which is readily incorporated in dry mixes or pastes of the tape joint compound in such an amount that the final tape joint compound contains about 0.005 to 0.1 percent by weight of bis (tri-butyltin) oxide.

In another embodiment of the invention, the liquid bis (tributyltin) oxide may be atomized and sprayed on a revolving batch of ground limestone in a concrete mixer.

Any other procedure may be employed which produces a dry powder of calcium carbonate containing bis (tributyltin) oxide uniformly dispersed thereon.

The following examples are given to illustrate but not to limit the invention.

Example 1

A typical dry powder tape joint compound was made up from the following ingredients:

| | Parts |
|---|---|
| Calcium carbonate | 1500.0 |
| Mica | 200.0 |
| Asbestos floats | 100.0 |
| Casein | 200.0 |
| Hydrated lime | 20.0 |
| Calcium stearate | 0.5 |
| Soda ash | 5.0 |
| | 2025.5 |

300 grams of said dry tape joint compound were mixed with sufficient water to give a good hard application consistency according to ASTM C-474-61 T, "Tentative Methods of Testing Joint Treatment Materials For Gypsum Wallboard Construction," issued 1961. This mix was allowed to soak 30 minutes, and then was remixed.

The mix was then divided into three equal parts (a), (b), (c), each containing 100 g. dry weight, which were treated as follows: (a) was mixed with 0.3 g. of calcium carbonate; (b) was mixed with 0.3 g. of a powder consisting of 95 percent by weight of calcium carbonate and 5 percent of bis (tri-n-butyltin) oxide obtained by depositing an acetone solution of the tin compound on calcium carbonate as set forth hereinabove; and (c) was mixed with 0.015 g. of liquid bis (tri-n-butyltin) oxide.

The three "patties" were then placed in separate mineral salt agar Petri dishes in an incubator at 30° C. and 80% relative humidity.

Sample (b) showed no evidence of change within 28 days; sample (c) showed heavy growth of fungus already within 5 days. The blank (a) showed slight growth after 24 hours, heavy growth within 2 days.

When the tests were repeated by placing patties as above on aluminum foil in an incubator, the results were similar, as shown in the following table:

| Sample | Additive | Days to Putrefaction |
|---|---|---|
| a | 0.3 g. CaCO$_3$ | 2 |
| b | 0.3 g. of 95% CaCO$_3$ and 5% bis (tributyltin) oxide. | >28 |
| c | 0.015 g. bis (tributyltin) oxide | 7 |

Example 2

The tests were similar to those in Example 1 except that the patties placed in Petri dishes were inoculated with a mixed fungus spore culture consisting of *Aspergillus niger, A. clavatus, Trichoderma sp., memoniella echinate, Myrothecium verrucaria, Chaetomium globosum*. The results were essentially the same except that sample (c) containing 0.015% bis (tributyltin) oxide went 10 days.

Example 3

The tests were similar to those of Example 2 except that in sample (c) the bis (tributyltin) oxide concentration was increased to 0.03%. With this concentration, sample (c) went only 3 days to putrefaction; at present, this result is as little understood as the extended activity of the bis (tributyltin) oxide when applied adhered to calcium carbonate instead of being added to a composition containing calcium carbonate as principal component.

Example 4

These tests were similar to the tests of the preceding examples except that 0.3 part of a preservative containing 90% of $CaCO_3$ and 10% bis (tributyltin) oxide were used for test (b). The results were the same as in Example 3.

Similar results were obtained with tape joint cements containing dextrin instead of casein.

It appears that all filled adhesives, sealants, and putties which contain organic compounds subject to microbial attack receive a much better protection by means of bis (tributyltin) oxide if the latter is applied previously adhered to a calcium carbonate or similar support instead of simply adding the bis (tributyltin) oxide to the composition even though such composition may contain large amounts of calcium carbonate or the like carrier. The effect of the $CaCO_3$ carrier in this case has obviously nothing to do with the well known use of inert carriers for fungicides which serve to form fine dusts for better distribution of the active material.

I claim:

1. A tape joint cement containing as essential ingredients calcium carbonate particles and an organic adhesive subject to microbial attack, in admixture with additional calcium carbonate particles carrying uniformly dispersed thereon bis (tri-n-butyltin) oxide in an amount of 0.005 to 0.1 percent by weight of the total cement, as preservative for said organic adhesive.

2. A tape joint cement as claimed in claim 1 wherein not more than 10 percent of the total calcium carbonate carry the total of the bis (tributyltin) oxide.

3. A tape joint cement as claimed in claim 1 wherein said organic adhesive is casein.

References Cited

UNITED STATES PATENTS

| | | | |
|---|---|---|---|
| 2,257,281 | 9/1941 | Scholz | 106—148 |
| 2,353,822 | 7/1944 | Gardner | 106—148 |
| 3,194,730 | 7/1965 | Nemec et al. | |
| 3,214,279 | 10/1965 | Scott. | |
| 3,239,411 | 2/1966 | Leebrick | 167—22 |

ALEXANDER H. BRODMERKEL, *Primary Examiner.*

MORRIS LIEBMAN, *Examiner.*

D. J. ARNOLD, *Assistant Examiner.*